United States Patent [19]
Gosdowski et al.

[11] Patent Number: 5,540,541
[45] Date of Patent: Jul. 30, 1996

[54] PIVOTAL ROBOT ARM

[75] Inventors: Gerhard Gosdowski, Bietigheim; Hans-Peter Buttau, Lauffen/N; Michael Leonhardt, Waiblingen, all of Germany

[73] Assignee: Robert Bosch GmbH, Stuttgart, Germany

[21] Appl. No.: 435,618

[22] Filed: May 5, 1995

Related U.S. Application Data

[63] Continuation of Ser. No. 915,810, filed as PCT/DE91/00886, Nov. 15, 1991 published as WO92/09407, Nov. 6, 1992, abandoned.

[30] Foreign Application Priority Data

Nov. 28, 1990 [DE] Germany .................. 40 37 773.3

[51] Int. Cl.$^6$ ................................. B25J 18/04
[52] U.S. Cl. .................. 414/744.5; 901/15; 901/28
[58] Field of Search ............... 414/744.5, 744.4; 901/15, 27, 28, 29; 74/490.03

[56] References Cited

U.S. PATENT DOCUMENTS

| | | | |
|---|---|---|---|
| 4,610,598 | 9/1986 | Hamada et al. | 414/744.5 |
| 4,650,234 | 3/1987 | Blatt | 414/752 X |
| 4,702,668 | 10/1987 | Carlisle et al. | 901/15 X |
| 4,706,515 | 11/1987 | Yasukawa | 901/15 X |
| 4,907,467 | 3/1990 | Toyoda et al. | 74/479 BP |
| 5,000,653 | 3/1991 | Gosdowski | 901/15 X |

FOREIGN PATENT DOCUMENTS

| | | |
|---|---|---|
| 0265835A1 | 5/1988 | European Pat. Off. . |
| 2590197 | 5/1987 | France . |
| 3323976A1 | 9/1984 | Germany . |
| WO89/04744 | 6/1989 | WIPO . |

Primary Examiner—Donald W. Underwood
Attorney, Agent, or Firm—Spencer & Frank

[57] ABSTRACT

A pivotal robot arm is disclosed which includes a support body, at least one pivot arm and a working device that is provided at the outer end of the pivot arm. The pivotal robot arm is characterized in that the support body and/or at least one pivot arm and/or the housing of the working device are each composed of at least one extruded profile that extends in the direction of the articulation axes.

8 Claims, 4 Drawing Sheets

PIVOTAL ROBOT ARM

This application is a continuation of application Ser. No. 07/915,810, filed as PCT/DE91/00886, Nov. 15, 1991, published as WO92/09407, Nov. 6, 1992, now abandoned.

BACKGROUND OF THE INVENTION

The invention is based on a pivotal robot arm comprising plural basic bodies. The basic bodies include a support body, at least one pivot arm and a working device. The at least one pivot arm has first and second extreme ends and parallel articulation axes. A pivot arm is articulated to the support body at a first end, and a pivot arm is articulated to the working device at a second end. Prior art pivotal robot arms of this type include housing components constructed of cast structures or welded composite structures of sheet metal or semi-finished castings. The cast or welded structures require a lot of material and high processing expenditures. EP-B1 0,265,835 discloses a pivot arm configuration for an industrial robot composed of two identical, extruded individual elements that have the length of the arm. Here the hollow shape extends in the direction of the reach of the pivot arm so that additional bearing points must be introduced into the pivot arm for the pivot axes.

SUMMARY OF THE INVENTION

The pivotal robot arm according to the present invention includes the features of forming at least one of the basic bodies of at least one extruded profile (extrusion) extending longitudinally in the direction of the articulation axes and shaping at least one bearing location into the extruded profile to accommodate a respective articulation axis. Typically, the extrusion has an irregularly shaped, constant cross-sectional profile along its longitudinal axis. This advantageously reduces the amount of material employed, permits an increase in robot dynamics and simultaneously reduces manufacturing costs in that the bearing points for the pivot axes are already shaped into the profiles.

The measures defined in the dependent claims provide for advantageous modifications of the pivotal robot arm defined in the main claim. A particular advantage is that the modular configuration of the extruded profiles ensures their repeated use. At the same time, the range of the pivotal robot arm can be varied by exchanging an individual profile.

BRIEF DESCRIPTION OF THE DRAWINGS

One embodiment of the invention is illustrated in the drawings and will be discussed in greater detail in the description below.

DETAILED DESCRIPTION OF THE PREFERRED EMBODIMENT

Figure 1:
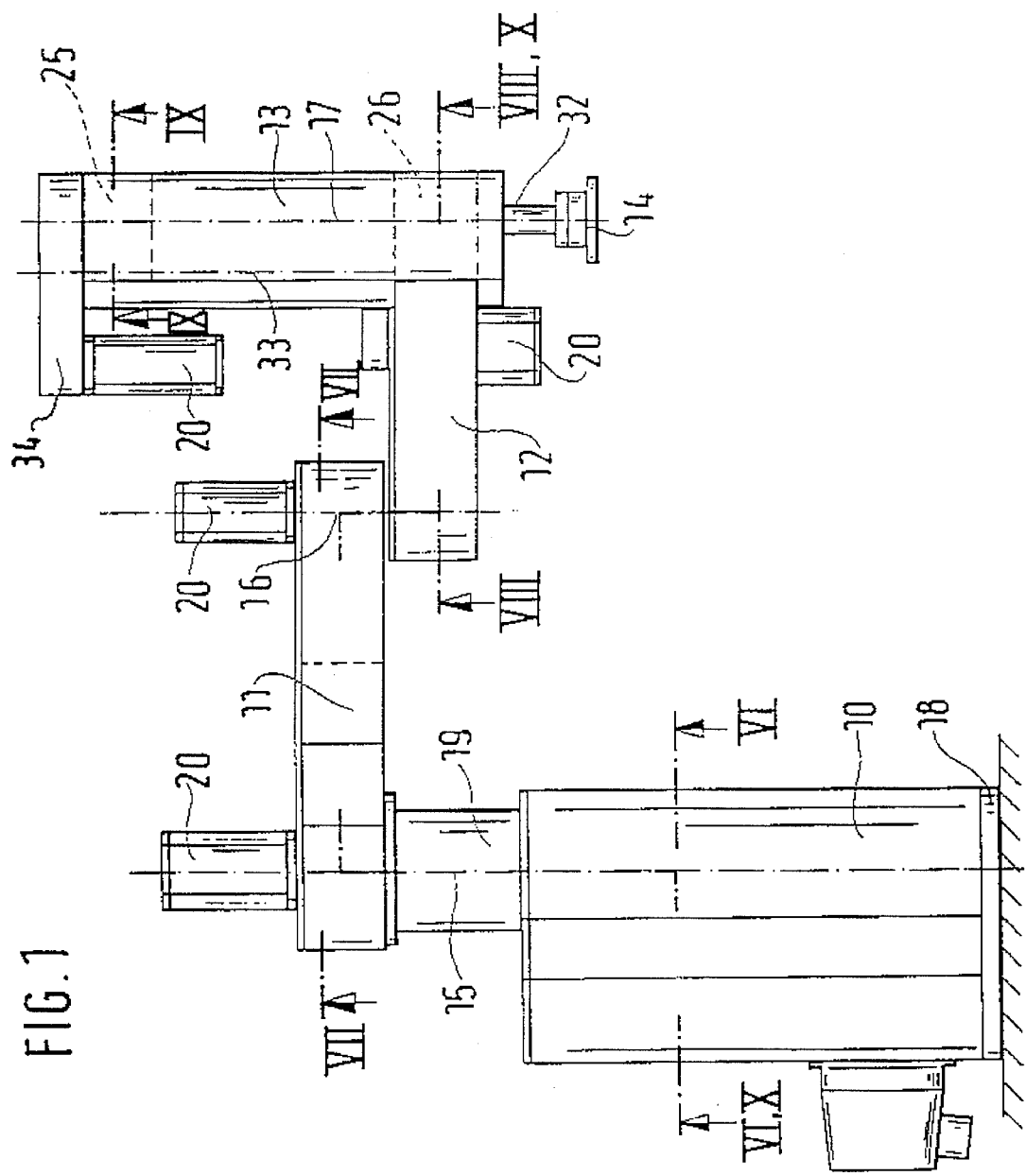
FIG. 1 is a side view of a basic representation of a pivotal robot arm.
Figure 2:
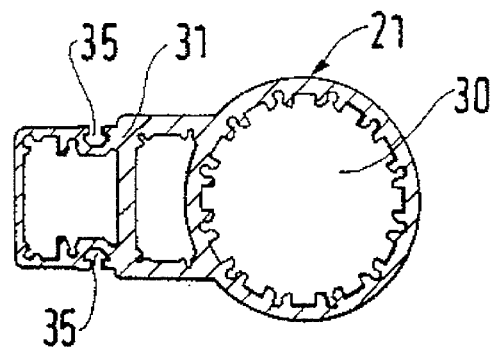
FIGS. 2 to 5 are cross-sectional views of the individual extruded profiles employed.

The pivotal robot arm includes a support body 10 from which a support extension 19 projects toward the top at which a first pivot arm 11 is mounted so as to rotate about a first pivot axis 15. Support body 10 is fastened to a base plate 18. Pivot arm 11 has a second pivot axis 16 in which a second pivot arm 12 is rotatably mounted. In the present embodiment, the second pivot arm 12 is disposed below the first pivot arm 11. However, it is just as conceivable to articulate the second pivot arm 12 above the first pivot arm 11. Both pivot arms 11 and 12 are pivotal parallel to one another in the horizontal plane.

The second pivot arm 12 is terminated by a working device, here a lifting and rotating unit 13, in which a gripper receptacle 14 disposed at a sleeve 32 is mounted so as to rotate about a rotation axis 17 and to be longitudinally displaceable in the vertical direction.

In each one of pivot axes 15 and 16, a drive 20, for example an electric motor with gears, is attached to the first pivot arm 11 and serves to generate the pivotal movement of the two pivot arms 11 and 12. A further electric motor 20 is attached by way of a gear assembly 34 at the upper end of lifting and rotating unit 13. This motor drives a spindle 33 that is indicated by a dash-dot line. The rotary movement of spindle 33 is transmitted to sleeve 32 by means of components that are not shown so that sleeve 32 performs a translatory movement. A fourth electric motor 20 is disposed at the lower portion of the lifting and rotating unit 13 and is also provided with non-illustrated transfer means to sleeve 32 in order to cause it to rotate.

FIGS. 2 to 5 show extruded profiles 21 to 24 that are employed for the modular structure of the pivotal robot arm. According to FIG. 6, profile 21 serves as a support body 10. The profile cross section of support body 10 is composed of a hollow cylinder 30 and a closed arm 31 attached laterally thereto and provided with two cavities. The two cavities formed by profile 21 at arm 31 serve as installation space for the energy supply lines. The support extension 19 is fastened in hollow cylinder 30.

Figure 7:
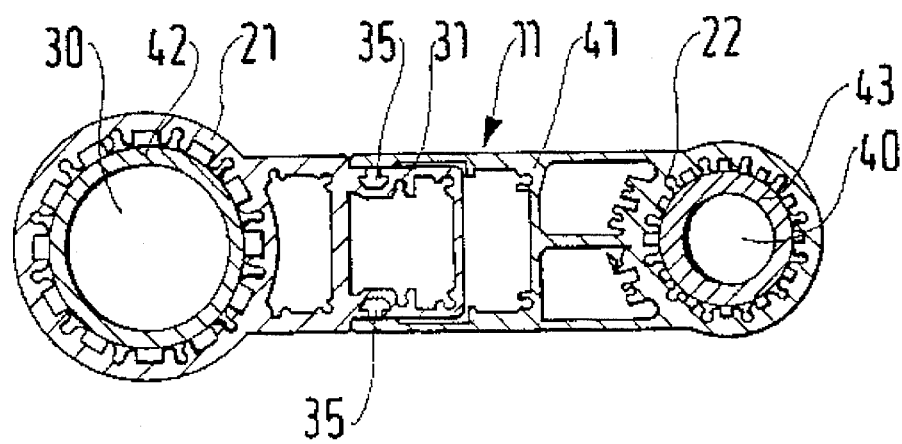
FIG. 7 is a cross-sectional view of the first pivot arm seen along line VII—VII of FIG. 1.

According to FIG. 7, the first pivot arm 11 is composed of profiles 21 and 22. Profile 22 (FIG. 3) is also provided with a hollow cylinder 40 which is followed on the side by an arm 41 that, however, is open on the side. The opening in profile 22 is here shaped in such a way that it grips over the arm 31 of profile 21. Both profiles may be fastened, for example, by means of two screws that are inserted on each side and are each screwed into a respective fastening element, for example, a hammer nut, that is introduced into the undercut grooves 35.

Figure 3:
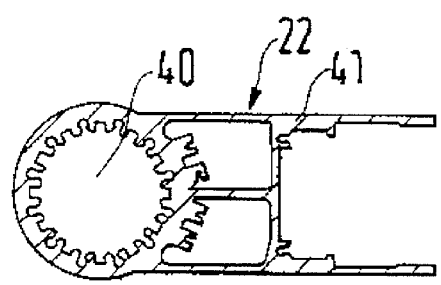
Figure 4:
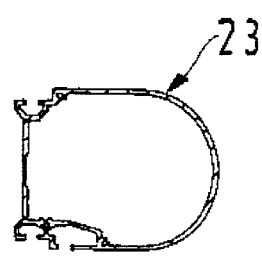
Figure 5:
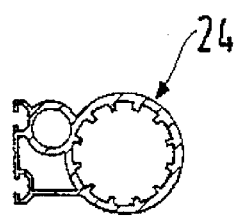
Figure 6:
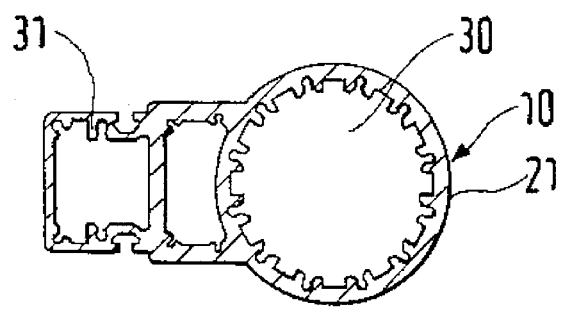
FIG. 6 is a cross-sectional view of the profile of the support body seen along line VI—VI of FIG. 1.
Figure 8:
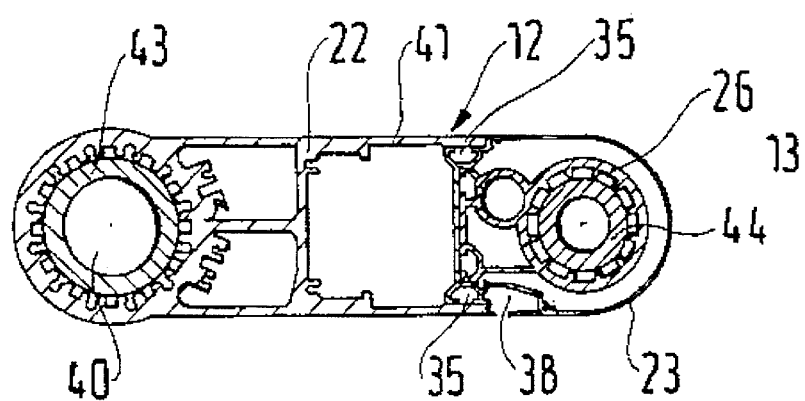
FIG. 8 is a cross-sectional view of the second pivot arm seen along line VIII—VIII of FIG. 1.
Figure 9:
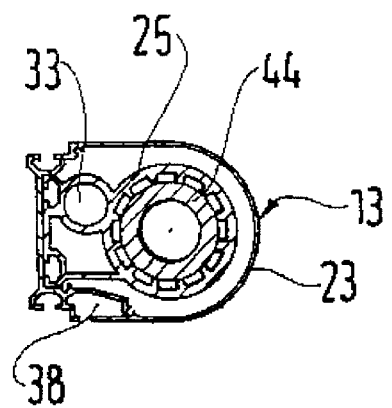
FIG. 9 is a cross-sectional view seen along line IX—IX of FIG. 1

According to FIG. 8, the second pivot arm 12 includes profiles 22, 23 and 24 (FIGS. 3 to 5). Profile 23 is fastened to the arm 41 of profile 22, with the fastening, as for pivot arm 11, being effected by means of screws. Profile 23 extends over the entire length of the lifting and rotating unit 13 and thus constitutes its housing. A recess 38 is shaped on alongside profile 23 and serves as a cable guide channel.

Within profile 23, there are two profiled sections of profile 24 which are screwed together by the already described manner of fastening. Profile 24 is essentially formed of two hollow cylinders which are each provided as bearing locations 25 and 26, respectively, for sleeve 32 and spindle 33. The two profile sections of profile 24 are here arranged so as to be spaced from one another. In the present embodiment, as can be seen in FIG. 1, the first bearing 25 is disposed at the upper end of lifting and rotating unit 13 and, according to FIG. 8, the second bearing 26 is positioned in the extension of the second pivot arm 12.

Figure 10:
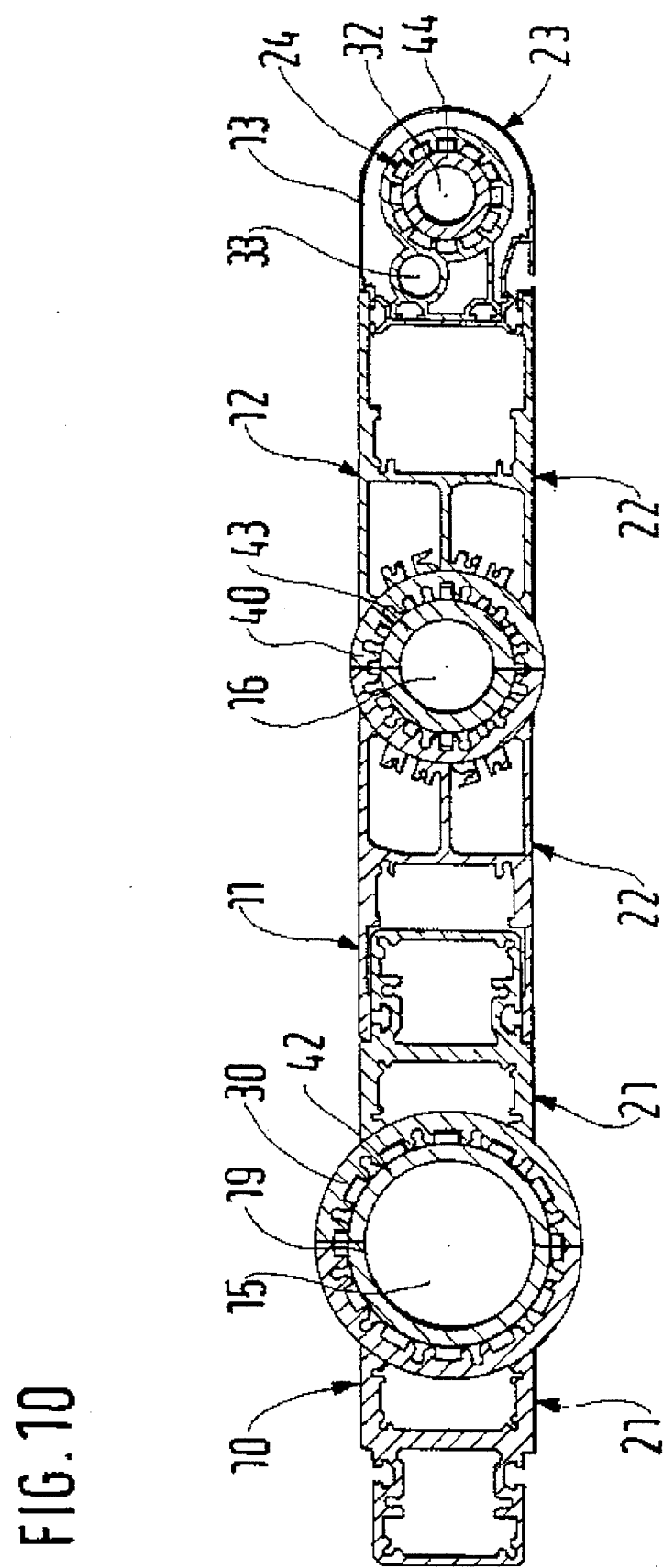
FIG. 10 is a cross-sectional view seen along line X—X of FIG. 1.

The modular configuration of the entire pivotal robot arm is shown in FIG. 10. Profile 21 forms support body 10. The same profile 21 together with hollow cylinder 30 is rotatably set onto support extension 19 which forms the pivot axis 15 for the first pivot arm 11. The two pivot arms 11 and 12 are rotatably mounted in the second pivot axis 16, with the bearing being realized by means of the hollow cylinders 40 of two superposed profiles 22. Pivot arm 12 is terminated by lifting and rotating unit 13 together with sleeve 32 and spindle 33. In this connection it is advisable to provide support for pivot axes 15 and 16 and for the rotating and lifting axis of sleeve 32 in a bearing bush 42, 43, 44 and 45, respectively.

We claim:

1. A pivotal robot arm comprising:
   a plurality of basic bodies including a support body, at least one pivot arm having first and second extreme ends and having parallel articulation axes, with said at least one pivot arm being articulated to the support body at the first extreme end, and a working device articulated to the at least one pivot arm at the second extreme end; and
   wherein at least one of said support body, said at least one pivot arm, and said working device is formed of at least one extruded part having a constant cross-sectional profile that extends substantially over an entire length thereof, and which longitudinally extends in the direction of the articulation axes; and at least one bearing location is shaped into said at least one extruded part to accommodate a respective articulation axis within the respective part.

2. A pivotal robot arm according to claim 1, wherein the support body and the at least one pivot arm each have an extruded part having identical extruded profiles, with the two parts having the identical extruded profiles being located in parallel planes, and the pivot arm part having the identical extruded profile being pivotal about an articulation axis, the at least one pivot arm further comprising at least one additional extruded part connected with the pivot arm part having the identical extruded profile in one plane to form the at least one pivot arm, said extruded parts collectively forming a modular configuration.

3. A pivotal robot arm according to claim 2, wherein said at least one pivot arm comprises a first pivot arm and a second pivot arm, and wherein the support body extruded part has a first cross sectional profile, the at least one pivot arm part having the identical extruded profile together with the additional extruded part having a second cross sectional profile forms the first pivot arm, and a further extruded part having a profile identical to the second cross sectional profile, together with another extruded part having a third cross-sectional profile forms the second pivot arm.

4. A pivotal robot arm according to 1, wherein the working device is a lifting and rotating unit including a gripper receptacle having a housing formed by a part having a first cross sectional profile, and a part having a further cross sectional profile attached within the part having the first cross sectional profile, with the part having the further cross sectional profile having a plurality of bearing locations for rotation and lifting axes of movable elements of the lifting and rotating unit.

5. A pivotal robot arm according to claim 2, further comprising fastening elements, and wherein, at the points of connection of at least two of said extruded parts, undercut grooves are shaped onto both sides of at least one extruded part to receive said fastening elements therein, by means of which the at least two extruded parts are fastened together.

6. A pivotal robot arm according to claim 1, wherein said working device, said at least one pivot arm, and said support body are each formed of at least one said extruded part.

7. A pivotal robot arm comprising:
   a plurality of basic bodies including:
      a support body;
      at least one pivot arm having first and second extreme ends and having parallel articulation axes, with said at least one pivot arm being articulated to the support body at the first extreme end; and
      a working device articulated to the at least one pivot arm at the second extreme end; wherein
   at least one of said support body, said at least one pivot arm, and said working device is formed of at least one extrusion having a constant cross-sectional profile that extends substantially over an entire length thereof, and which longitudinally extends in the direction of the articulation axes; and
   at least one bearing location is shaped into said at least one extrusion to accommodate a respective articulation axis within the respective extrusion.

8. A pivotal robot arm according to claim 7, wherein the support body and the at least one pivot arm each have a respective identical extrusion with the two identical extrusions being located in parallel planes and the pivot arm identical extrusion being pivotal about one of the articulation axes, the at least one pivot arm further comprising at least one additional extrusion connected with the pivot arm identical extrusion in one plane to form the at least one pivot arm, said extrusions collectively forming a modular configuration.

* * * * *